United States Patent
Pandey et al.

(10) Patent No.: US 8,037,280 B2
(45) Date of Patent: Oct. 11, 2011

(54) SYSTEM AND METHOD FOR IMPROVING MEMORY LOCALITY OF VIRTUAL MACHINES

(75) Inventors: Vivek Pandey, Mountain View, CA (US); Ole Agesen, Palo Alto, CA (US); Alex Garthwaite, Beverly, MA (US); Carl Waldspurger, Palo Alto, CA (US); Rajesh Venkatasubramanian, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 528 days.

(21) Appl. No.: 12/137,351

(22) Filed: Jun. 11, 2008

(65) Prior Publication Data
US 2009/0313445 A1 Dec. 17, 2009

(51) Int. Cl.
*G06F 13/00* (2006.01)
*G06F 13/28* (2006.01)
*G06F 9/46* (2006.01)
*G06F 15/16* (2006.01)
*G06F 9/26* (2006.01)
*G06F 9/34* (2006.01)

(52) U.S. Cl. ............... 711/206; 711/166; 711/E12.001; 718/105; 709/232; 710/35

(58) Field of Classification Search ............... 711/206, 711/166, E12.001; 718/105; 709/232; 710/35
See application file for complete search history.

(56) References Cited

U.S. PATENT DOCUMENTS

2008/0155168 A1* 6/2008 Sheu et al. .................... 711/6
2009/0064136 A1* 3/2009 Dow et al. .................... 718/1

* cited by examiner

*Primary Examiner* — Edward Dudek, Jr.

(57) ABSTRACT

A system and related method of operation for migrating the memory of a virtual machine from one NUMA node to another. Once the VM is migrated to a new node, migration of memory pages is performed while giving priority to the most utilized pages, so that access to these pages becomes local as soon as possible. Various heuristics are described to enable different implementations for different situations or scenarios.

29 Claims, 5 Drawing Sheets

SYSTEM AND METHOD FOR IMPROVING MEMORY LOCALITY OF VIRTUAL MACHINES

TECHNICAL FIELD

One or more embodiments of this invention relate generally to virtual machines, and, in particular, to improving memory locality of virtual machines in Non-Uniform Memory Access (NUMA) systems.

BACKGROUND

Modern computer systems provide support for virtual memory. With this support, an application sees a contiguous address space that is not tied to underlying physical memory in a computer system. In particular, an application accesses a virtual address (VA) that is translated to a physical address (PA) which is used to access the physical memory. The translation proceeds in one of two ways, depending on whether the system architecture supports "segmentation" or not. If the system architecture supports segmentation, then a VA is added to a value in a "segment base register," to produce what is called a linear address (LA). The value of the VA is compared with a value in another register called a "segment limit register." If the value of the VA is greater than the value in the segment limit register, then a "general protection fault" is generated, and execution jumps to a fault handler. Otherwise, the LA is translated to the PA using hardware called a Memory Management Unit (MMU). If the system architecture does not support segmentation, then the LA is the same as the VA, and the VA is used by the MMU to translate to the PA.

FIG. 1B is a block diagram that helps illustrate how the MMU performs the translation process. The following uses a 64 bit architecture and a 4 KB page size for sake of illustration. However, similar steps may be utilized for a 32 bit architecture, and different page sizes may be utilized as well. A more detailed discussion of translation processes can be found in "Intel 64 and IA-32 Architecture Application Note: TLBs, Paging-Structure Caches, and Their Invalidation" available from Intel of Santa Clara, Calif. Although this specification describes translation processes for Intel processors, the details are similar for other popular x86 based processors, and embodiments of the invention may be implemented on any x86 or non-x86 based processor that supports virtual memory.

With respect to the x86 architecture, the MMU consists of the following parts: a control register CR3, a translation look aside buffer (TLB), and translation circuitry. The paging structures: (a) are 4 KB in size; (b) reside in main memory, generally separate from the MMU; and (c) are designated L4, L3, L2 and L1 page tables (they are sometimes also called level 4, 3, 2 and 1 page tables), respectively. In some implementations, the page table structures contain 512 8-byte entries comprising information required to perform the translation. The following information is relevant here. First is a CR3 register which contains the physical address of some L4 page table. Second is a physical page number of the next lower level page table. For example, referring to FIG. 1B, a page table entry in the L4 page table contains the physical page number of the L3 page table. Third is a present bit (P-bit). The P-bit indicates whether a page table entry is "present" or "not present." If the P-bit is 0 in any page table entry, translation stops and a page fault is generated. Fourth is an access bit (A-bit). When a linear address is used to access memory, the processor sets the A-bit to 1 in all page table levels used to translate the linear address.

As is well known, translation of a linear address LA (generally referred to as "walking the page table" or a "page table walk") proceeds as follows. A linear page number (LPN) is formed from the most significant 52 bits of the LA. The least significant 12 bits of the LA constitute what is called an "offset." Using the CR3 register, the physical address of the L4 page table is determined. An entry in the L4 page table is selected by bits 47:39 of the LA; the selected entry contains a physical address of the L3 page table. An entry in the L3 page table is selected by bits 38:30 of the LA; the selected entry contains a physical address of the L2 page table. An entry in the L2 page table is selected by bits 29:21; the selected entry contains a physical address of the L1 page table. An entry in the L1 page table is selected by bits 20:12; the selected entry contains a PPN corresponding to the LPN. Finally, the PA comprises the PPN as its 52 most significant bits, and the offset as its 12 least significant bits.

As is well known, an MMU is typically equipped with one or more TLBs, where a TLB is a cache of recent LPN to PPN translations. To translate an LA, the MMU computes the LPN, and then looks in the TLB for a translation of the LPN. If the translation is present in the TLB (referred to as a "TLB hit"), the PPN is immediately available from the TLB. On the other hand, if the translation is not present in the TLB (referred to as a "TLB miss"), a page table walk is done, and the translation is stored in the TLB, potentially evicting another entry from the TLB.

As is well known, virtualizing an MMU so that multiple virtual machines can run on a single hardware system typically entails another level of translation. The first translation is provided by a guest operating system (guest OS) running in a virtual machine. The guest OS translates a guest LPN (GLPN) into a corresponding guest PPN (GPPN) in the conventional manner. The second translation is provided by virtualization software, for example, a virtual machine monitor (VMM). In particular, the VMM maintains a GPPN to "host PPN" mapping in its internal translation table where the host PPN is used to address physical memory of the hardware system. In the rest of this specification, this translation table will be referred to as T.

One of two methods is typically used for virtualizing an MMU, namely a shadowing of guest paging structures method (shadowing method), and a hardware assist method. FIG. 1C illustrates the shadowing method. As shown in FIG. 1C, in the shadowing method for virtualizing an MMU, virtualization software, for example, the VMM, maintains shadow page tables, one shadow page table for each guest page table. While the guest page tables, maintained by the guest operating system, contain guest LPN to guest PPN mappings, the shadow page tables contain guest LPN to host PPN mappings. To insert a translation for a guest LPN gl into a shadow page table, the VMM walks the guest page table to determine the guest PPN gp. Then, it translates the guest PPN gp to a host PPN hp using its translation table T.

In operation, for a particular guest, the VMM changes the CR3 register so that it points to the shadow page table for that guest. By doing this, the hardware MMU uses the shadow page table for address translation. Further, the VMM saves the value of the CR3 register for that guest. To ensure correct guest operation, the VMM traps guest accesses to the CR3 register. Thus, whenever the guest reads the CR3 register, the VMM provides it with the saved value of the CR3 register. Further, whenever the guest writes to the CR3 register, the VMM saves the new value of the CR3 register for the guest, and writes to the physical CR3 register the physical address of the new shadow page table.

When a new shadow page table is loaded by the VMM (by writing a new value to the CR3 register in response to a guest writing to the CR3 register), it is not necessary that the shadow page table contains valid entries corresponding to all valid entries in the guest page table. For a guest page table entry, if the PPN in its corresponding shadow page table entry is invalid, the VMM sets the P-bit of that shadow page table entry to 0. Then, when this shadow page table entry is used to translate an address, a page fault will be generated. Such a page fault is called a "hidden page fault" because it would not have been generated if the guest operating system were executing in a non-virtualized environment. In response, a page fault handler of the VMM determines the faulting guest linear page number gl (using a faulting virtual address put into a predetermined hardware register), and translates it to a guest physical page number gp by walking the guest page tables. Then, the guest physical page number gp is translated to a host physical page number hp using translation table T. Finally, the host physical page number hp is inserted into the concerned shadow page table entry, the P-bit of the entry is set to 1, and the faulting guest instruction is restarted.

The VMM needs to ensure that shadow page tables are synchronized with guest page tables. For example, if the guest OS changes a translation of guest linear address gl from gp to gp', the VMM needs to update the corresponding entry in the shadow page table as well.

The hardware assist method for virtualizing an MMU makes use of a virtualization assist provided in certain modern CPUs. As is well known, apart from conventional page tables provided by earlier CPUs, certain modern CPUs provide a second layer of page tables. The design of the second layer of page tables, called "hypervisor page tables," is similar to that of the guest page tables as described above. The guest page tables, maintained by the guest operating system, continue to contain guest linear to guest physical translations. However, the hypervisor puts the guest physical to host physical translations in the second layer of page tables (description of hypervisor is provided in the Appendix below). Apart from the CR3 register provided by earlier CPUs, the virtualization assist of the modern CPUs provides an hCR3 register which contains the host physical address of the L4 page of the hypervisor page tables.

With the hardware assist, on a TLB miss, the MMU walks through both sets of page tables to translate a guest linear address to a host physical address. This is done by using translations from the guest page tables and the hypervisor page tables: the guest linear address is translated to a guest physical address using the guest page tables, and the guest physical address is translated to a host physical address using the hypervisor page tables. Using the hardware assist obviates the construction and maintenance of shadow page tables.

FIG. 1D illustrates an example of virtual machine memory virtualization. As shown in FIG. 1D, each of the virtual machines VM1 and VM2 runs two processes: process 1 and process 2. The processes execute using virtual memory 122, which is mapped to physical memory 124, and physical memory 124 is mapped, in turn, to machine memory 126. The guest OS in each virtual machine maps virtual memory (i.e., virtual page numbers (VPN)) to guest physical memory (i.e., guest physical page number (GPPN))—this is shown by inset 112. In addition, virtualization software, for example, a VMM, maintains a mapping of guest physical page numbers (GPPN) to actual machine or host page numbers (MPN)—this is shown by inset 114. The VMM also maintains a mapping of VPN to MPN in shadow page tables to map virtual memory directly to machine memory (i.e., VPN to MPN) to avoid two levels of translation on every access—this is shown by inset 116. When the guest OS changes the virtual memory to physical memory mapping, the VMM updates (or invalidates) the shadow page tables to enable a consistent lookup (or generation of a hidden page fault).

Various advancements in microprocessor fabrication have led to modern CPUs that are significantly faster than main memory. Consequently, CPUs running demanding applications may become constrained by memory bandwidth. This issue may be exacerbated in symmetrical multiprocessing (SMP) systems wherein applications running on several CPUs access main memory together, thereby competing for access to a shared memory bus. To overcome this issue, a Non-Uniform Memory Access (NUMA) architecture has been developed.

In NUMA machines, processors are divided into NUMA nodes where each node has a separate memory, and a bus connects the processors of a node to the memory. An example is illustrated in FIG. 1E where each NUMA node, NUMA 101 and NUMA 102, has several processors coupled to local memory. As further shown in FIG. 1E, the different NUMA nodes are connected by an interconnect 103. In NUMA machines, each processor can access any memory, including memory on different NUMA nodes; however, access to memory on the same NUMA node (referred to as "local memory") is faster than access to memory on a different NUMA node (referred to as "remote memory"). Due to this, software designers attempt to ensure that data most often accessed by a program running on a CPU (called a "working set" of the program) usually reside on the same NUMA node as the CPU.

From time to time, it may become necessary or desirable to migrate a virtual machine from one NUMA node to another. Consider, for example, a situation illustrated in FIG. 1E where NUMA node 101 includes processor A having two virtual machines, VMA1 and VMA2, running demanding applications, thereby heavily loading processor A. On the other hand, assume that one or both of processors A' and B' on NUMA node 102 are lightly loaded. To alleviate the load on processor A, it may be desirable or necessary to migrate one of VMA1 and VMA2 to NUMA node 102. Such load balancing may be done automatically by continuously monitoring the load on all of the nodes.

SUMMARY

Aspects of the invention provide a system and related method of operation for migrating a virtual machine from one NUMA node to another. Once the VM is migrated to a new NUMA node, migration of memory pages is performed while giving priority to the most utilized pages, so that access to these pages becomes local as soon as possible. Various heuristics are described to enable different implementations for different situations or scenarios.

According to aspects of the invention, a method for migrating a virtual machine and memory pages from a first node to a second node is provided, the method comprising: a. migrating the virtual machine from the first node to the second node; b. monitoring memory access requests of the virtual machine and identifying priority pages for migration from the first node to the second node; c. initiating page migration process and migrating at least a subset of the priority pages from the first node to the second node. Steps b. and c. may be repeated until occurrence of at least one event selected from: a set number of steps b. and c. has been repeated; fewer than a predetermined number of priority pages have been identified; a set amount of time period has passed; all of the pages have been migrated from the first node to the second node; or the virtual machine has been migrated away from the second node. The method may further comprise: upon termination of repeating steps b. and c., migrating any remaining pages according to one of: random selection or fragmentation minimizing selection, or sequential selection. Step b. may comprise monitoring hidden page faults and identifying faulting pages residing on the first node as priority pages. Step a. may further comprise discarding one of shadow page tables or second level page tables upon migrating the virtual machine to the second node. The method may further comprise discarding one of shadow page tables or second level page tables upon each completion of step c. Step c. migration may be initiated when: a predetermined time period has elapsed or the number of priority pages reaches a predetermined threshold.

In step c., of the method, a predetermined number of N pages may be migrated (N may be dynamically varied) and: when the number of priority pages comprises less than N, the method may proceed by migrating all the priority pages and selecting further pages from the first node; and when the number of priority pages comprises more than N, the method may proceed by migrating only N priority pages. The method may further comprise: for each one of the pages corresponding to memory access requests, designating neighboring pages as priority pages.

Step b. may comprise clearing access bits of memory page table entries (PTE) residing on the first node and thereafter identifying as a priority page each page having its corresponding PTE access bit set by an access operation. Clearing access bits of memory page table entries (PTE) residing on the first node may be performed after each completion of step c. Step b. comprises clearing the P-bits of shadow page table entries that translate a guest linear address to a host physical address on pages residing on the first node.

According to aspects of the invention, a machine executable process for migrating a virtual machine and memory pages from a first node to a second node is provided, comprising: a. migrating the virtual machine from the first node to the second node; b. setting a time period for periodic migration of pages from the first node to the second node and, during each period performing the steps: b.1. monitoring memory access requests of the virtual machine and identifying priority pages corresponding to memory access requests mapped to pages on the first node; b.2. when the time period has elapsed, initiating page migration process and migrating priority pages from the first node to the second node; and b.3. determining whether the process should revert to step b.1. or terminate. The process may further comprise: when the process terminates at step b.3., performing page migration according to a secondary procedure. The secondary procedure may comprise at least one of, random migration, minimizing defragmentation migration, and migrating pages having A-bit set. Step b.1. may comprise monitoring hidden page faults and identifying faulting pages residing on the first node as priority pages. The process may further comprise arranging the priority pages in a queue or a stack. Step a. may further comprise discarding one of shadow page tables or second level page tables upon migrating the virtual machine to the second node. Step b.1. may comprise clearing access bits of memory page table entries (PTE) residing on the first node and thereafter identifying each page having its corresponding PTE access bit set due to access operation as priority page.

According to aspects of the invention, a computerized virtual machine is provided, comprising: virtualized hardware; virtual machine monitor; a plurality of virtual pages; page mapping tables storing mapping of virtual page numbers to guest physical page numbers; and a prioritizer listing priority pages having priority for migration. The prioritizer may comprise a queue or a stack. The virtual machine may further comprise hidden page fault identifier, which provides faulting page identification to the prioritizer. The virtual machine may further comprise an access bit identifier that provides page identification to the prioritizer according to the access bit setting corresponding to the virtual pages.

According to aspects of the invention, a computer readable storage medium holding computer software for executing on the destination computer is provided, the software embodying a method comprising: upon receiving migration instruction for migrating a virtual machine from a first node to a second node, performing the steps: a. migrating the virtual machine to the second node; b. discarding page tables comprising mapping of virtual pages to machine pages; c. setting a time period for periodic migration of pages from the first node to the second node and, during each period performing the steps: c.1. whenever a memory access generates a hidden page fault, storing identity of faulting page addressed by the page call; c.2. when the time period has elapsed, initiating page migration process and migrating N pages from the first node to the second node, wherein N comprises a natural number and the N pages include at least the faulting pages; c.3. determining whether the process should revert to step c.1. or terminate. During at least one iteration of steps c.1. to c.3. the N pages may comprise the faulting pages and randomly selected pages.

According to aspects of the invention, a computer readable storage medium holding computer software for executing on the destination computer is provided, the software embodying a method comprising: upon receiving migration instruction for migrating a virtual machine from a first node to a second node, performing the steps: a. migrating the virtual machine to the second node; b. setting a time period for periodic migration of pages from the first node to the second node and, during each period performing the steps: b.1. clearing access bit of all pages; b.2. when the time period has elapsed, checking the access bit of all pages, and listing accessed pages having their access bit set to indicate occurrence of page access since last clear; b.3. initiating page migration process and migrating N pages from the first node to the second node, wherein N comprises a natural number and the N pages include at least the accessed pages; and b.4. determining whether the process should revert to step b.1. or terminate. During at least one iteration of steps b.1. to b.4. the N pages may comprise the accessed pages and randomly selected pages.

DETAILED DESCRIPTION

Figure 1A:
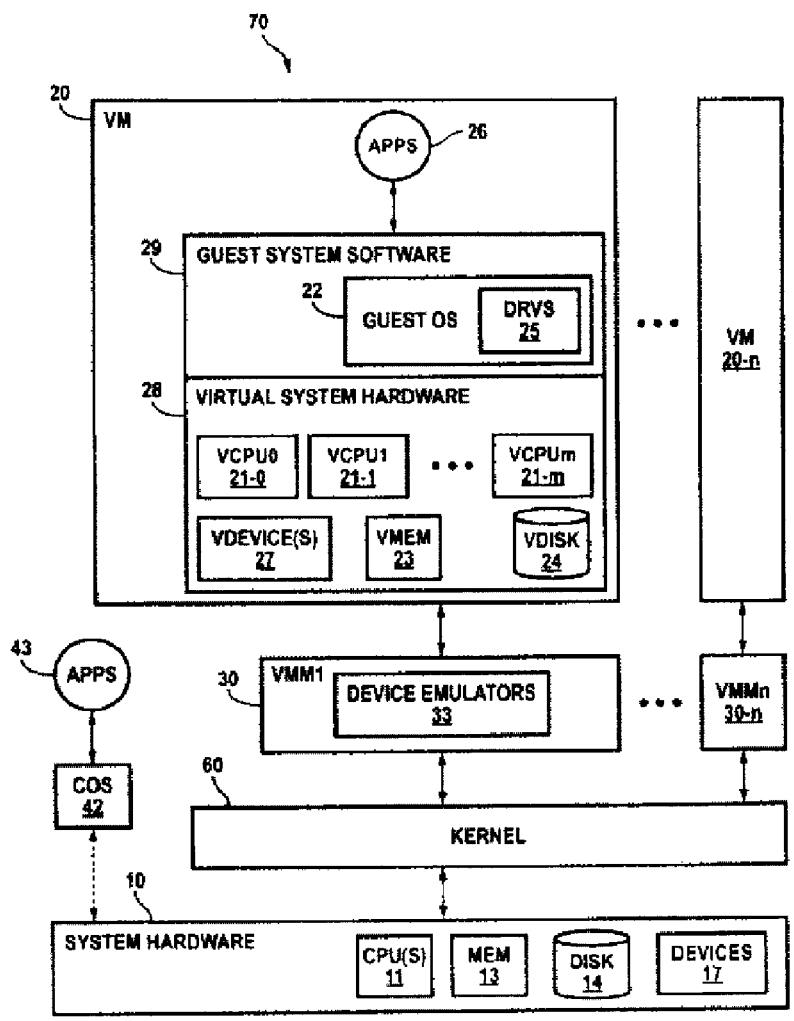
FIG. 1A is a block diagram of a non-hosted virtualized computer system.
Figure 1B:
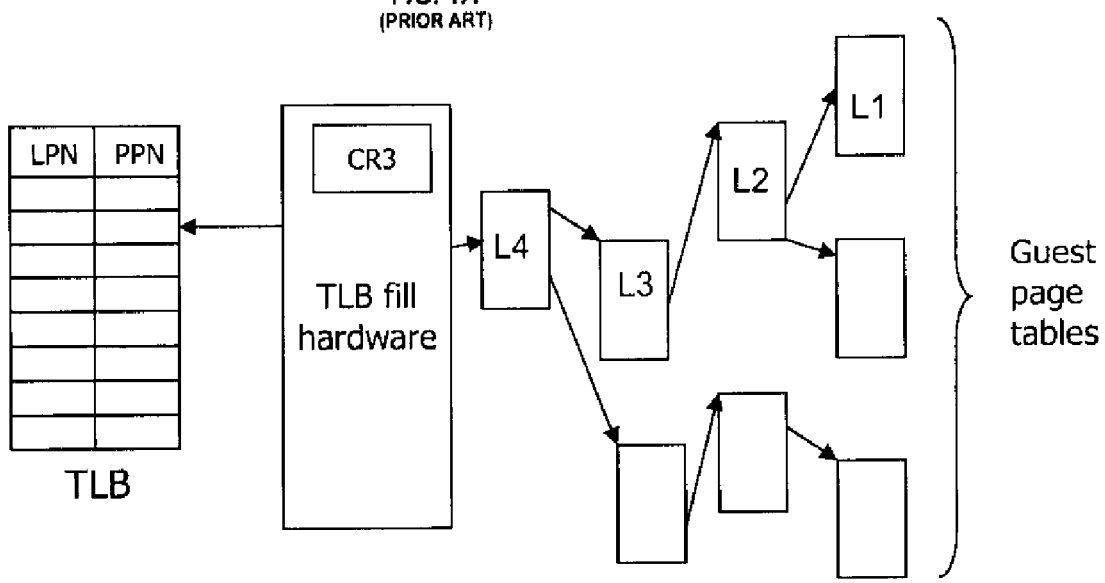
FIG. 1B is a block diagram that helps illustrate how an MMU performs translation.
Figure 1C:
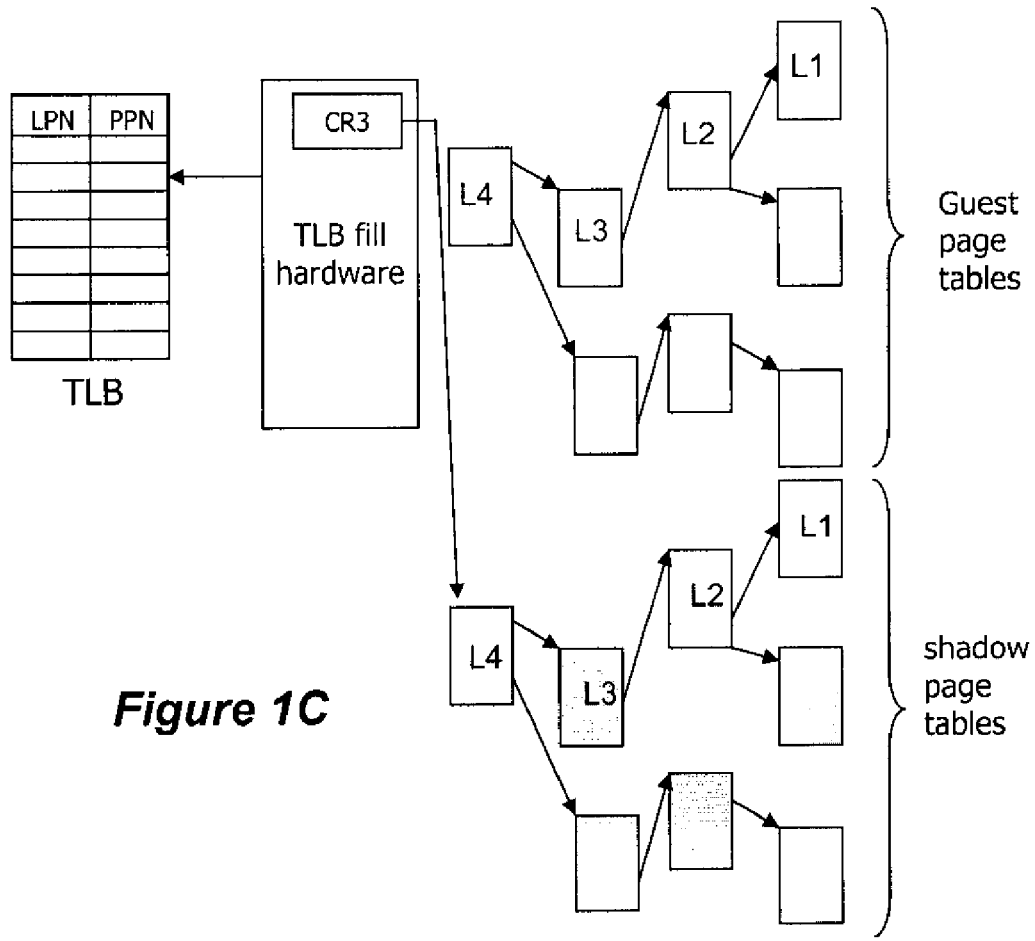
FIG. 1C illustrates a shadowing method for virtualizing an MMU.
Figure 1D:
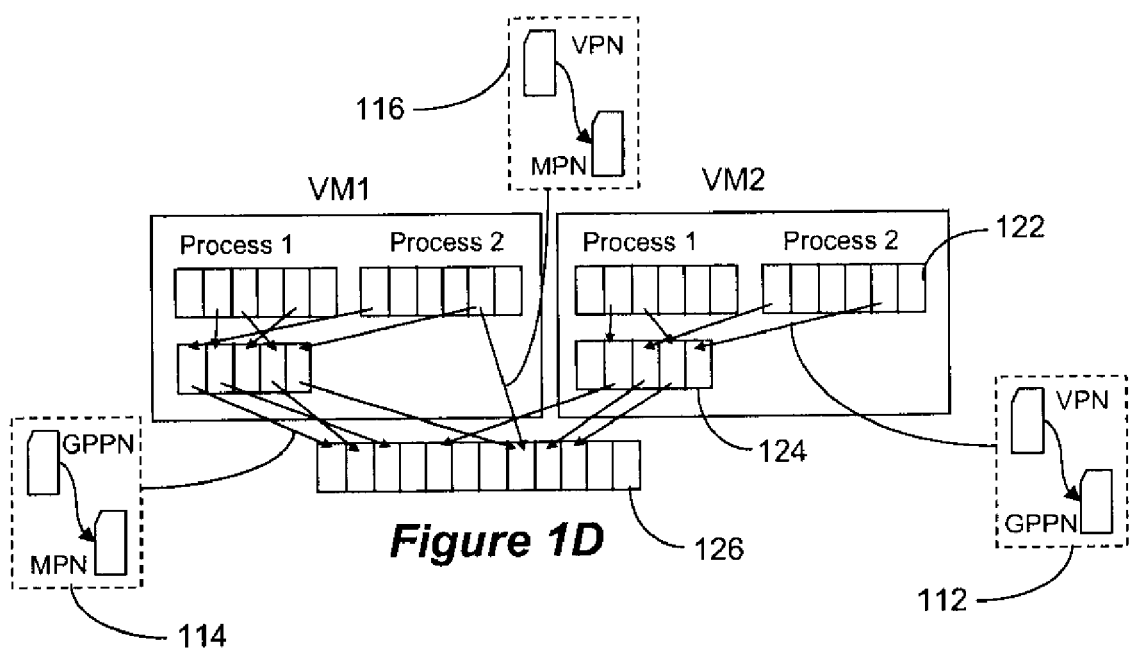
FIG. 1D illustrates an example of virtual machine memory virtualization.

The following detailed description of the various embodiments of the invention assumes the reader's familiarity with virtualization; nevertheless, the Appendix at the end provides some background relating to virtualization technology. It should be appreciated that one or more embodiments of the present invention may be implemented wholly or partially in hardware, for example and without limitation, in processor architectures intended to provide hardware support for VMs.

As described above, when several VMs are running on an SMP machine with several Non-Uniform Memory Access (NUMA) nodes, at times, VMs may be migrated across NUMA nodes for load balancing among various CPUs of the machine to improve VM performance. The inventors have discovered a potential performance drop that occurs immediately following migration. This occurs because, immediately after a VM is migrated across a NUMA node, most guest memory accesses will be to the previous node, i.e., remote memory accesses rather than local memory accesses. Consequently, until all memory pages have been migrated to the new node, higher latency remote memory accesses degrade performance. To illustrate, with reference to FIG. 1E, assume that VMA1 is running on NUMA node 101, and a working set of memory pages is stored in local memory on NUMA node 101. Then, when the execution VMA1 is migrated to NUMA node 102, VMA1 would have to access pages that reside on NUMA node 101 remotely until they have been moved to NUMA node 102. Since remote memory access latency is higher than local memory access latency, this may result in performance degradation for applications running in VMA1.

To regain the performance level that existed before migration of VMA1, the pages used by VMA1 are migrated from NUMA node 101 to NUMA node 102. However, migrating pages between NUMA nodes consumes processing resources, and hence, migrating pages belonging to VMA1 all at once would lead to an unacceptably long pause in execution of VMA1 while the migration is in progress. The reason is that the transfer for any given page needs to be atomic with respect to the VM's access to and manipulation of the content of that page. Thus, in accordance with one or more embodiments of the present invention, the pages are migrated over time. For example, according to one embodiment, a configurable number of pages, which may range from 50 to 1000, are transferred every preset period, e.g., one second. In accordance with one or more embodiments of the invention, the period is configurable as well, and is termed an "epoch." As can be understood, under such conditions, completing memory migration of a 64 GB virtual machine may take over four hours, during which the VM would perform at suboptimal levels.

According to one or more further embodiments of the present invention, methods are provided for "smart" selection of the order in which the pages are migrated. In particular, in accordance with one or more such embodiments, various heuristics are provided that may be used alone or in combination, to tailor the migration to different scenarios. In essence, in accordance with one or more embodiments of the invention, a working set of pages of the VM that may be migrated first is identified. In accordance with one or more such embodiments, the pages belonging to the working set may be migrated randomly or in any particular order. Thereafter, page migration may proceed using the same or other methods.

Figure 2:
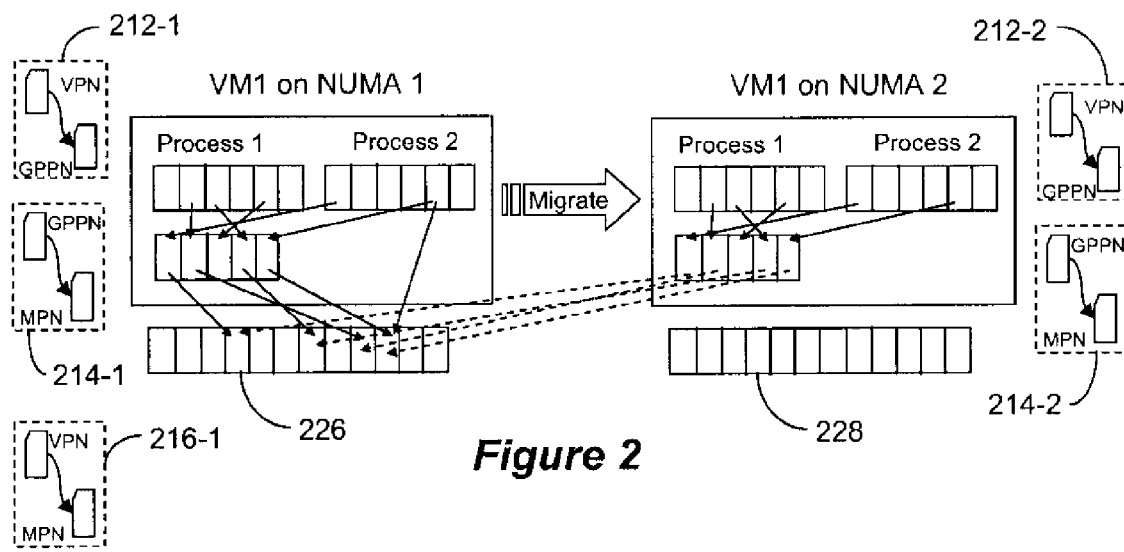
FIG. 2 is schematic diagram illustrating migration of a virtual machine from one NUMA node to another.

The following is a description of a first embodiment of the invention with reference to FIG. 2. As explained in the Background above, a virtualization layer, for example, a VMM, maintains shadow page tables for translating guest linear page numbers to host physical page numbers (inset 214-1 in FIG. 2). According to this embodiment, shadow page tables 214-1 for VM1 on NUMA node 1 are discarded and the TLB is flushed when VM1 is migrated from NUMA node 1 to NUMA node 2. Incidentally, while this embodiment is described with regard to the shadowing method for virtualizing an MMU, it is equally applicable to the hardware assist method for virtualizing an MMU virtualization where the method of dealing with the shadow page tables in the shadowing method being replaced by the same method of dealing with VMM maintained "hypervisor page tables." In such an implementations, the hypervisor page tables would be discarded like the shadow page tables.

In accordance with this embodiment, since the shadow page tables are discarded and the TLB flushed, when VM1 accesses memory in some guest linear page for the first time after migration, no translation for that page exists in the TLB, or in the shadow page tables. This leads to a hidden page fault, at which time the VMM inserts the proper translation in the shadow page tables as described above. According to this embodiment, guest physical pages corresponding to the faulting guest linear pages are considered to constitute a working set of the VM, and their identity is stored in a data structure D. In this respect, any conventional data structure may be used, e.g., a FIFO (first in, first out data structure—also referred to as a queue), a LIFO (last in, first out data structure—also referred to as a stack), etc. The data structure D may be sized to be able to track all possible pages, or some bounded set. If the data structure is bounded, it may be resized and may be circular, so that new entries may or may not be allowed to overwrite older ones. These guest physical pages of the virtual machine are migrated during the next invocation of a migration routine of the virtualization layer, for example, a hypervisor, i.e., during the next epoch.

According to this embodiment, during every epoch, the hypervisor transfers N pages, where N is a constant or a variable. For example, N may be set as a constant set by an administrator during the configuration phase—selecting a size that strikes a balance between the need to bound the duration during which the application is paused and the need to transfer the memory pages to the local node as soon as possible. On the other hand, N may be set to vary based on input such as bus transmission speed, computing resource allocation and usage, etc. If data structure D contains more than N page numbers, the remaining pages may be discarded, and D may be freshly populated during the next epoch. However, according to one or more alternative embodiments of the present invention, the remaining pages are migrated during some subsequent epoch, e.g., the next epoch. If, on the other hand, data structure D contains fewer than N pages, further pages are chosen randomly from amongst all the guest physical pages. In addition, and in accordance with one or more further alternative embodiments, when data structure D overflows, the shadow page tables are dropped again. This will again generate hidden page faults for the most accessed pages, so that these pages will be recorded for migration. As can readily appreciated, the above-described method may be repeated a certain number of times (x), the number being a constant or a variable, or until all or most working set pages have been identified and migrated. For example, the number may be selected so that a given percentage of the total allocated pages would be transferred according to the prioritizing method, and the remainder pages may be simply transferred randomly. Notably, as entries in data structure D are removed, new entries may be added without waiting for the entire structure to empty.

In further addition, and in accordance with one or more still further alternative embodiments, the data structure (for example, queue or stack) may be sized so that no overflow may occur. According to yet another alternative, x and/or N may be dynamically varied, for example and without limitation, first, to migrate faulting pages aggressively, and then, to change or revert to a less aggressive migration scheme when the rate of hidden page faults falls below some threshold or drops to zero. For example, when aggressive migration is needed, additional migration may be performed between epochs or N may be selected to be larger than a predetermined number.

In the above embodiment, since the shadow page tables are discarded, hidden page fault processing occurs even for pages that are already local to the new NUMA node. On the other hand, in accordance with another embodiment, the shadow page tables are not discarded at the time of VM migration. Rather, the P-bits of shadow page table entries that translate a guest linear address to a host physical address on a page residing on a remote NUMA node are cleared (or set to 0) to indicate that these pages are not present, while P-bits for entries that translate guest linear addresses to host physical addresses on a local NUMA node are not modified. Consequently, when a PTE having a P bit cleared is accessed for address translation, a hidden page fault is generated, and a list of such pages can be made for migration during the next epoch. In accordance with one or more such embodiments, a hidden page fault is not generated on an access to a guest physical page residing on local NUMA node. This leads to fewer hidden page faults, and thus a smaller computational overhead. The ID data structure D is set up in the same manner as with the previous embodiment. Further, rather than initiating migration at the end of each epoch, migration can be performed whenever the number of pages in data structure D increases above a threshold value.

In accordance with any of the embodiments described above, there may come a time when the working set is smaller than the total number pages available for migration by, for example and without limitation, a predetermined amount. Therefore, at some point, the migration method may be changed. For example, as indicated above, when the total number of pages queued in an epoch is less than N, the hypervisor could select the remaining pages randomly. In accordance with one or more such embodiments, selection of pages could become random once the working set has been migrated. On the other hand, if only a small number of pages are queued at each epoch for several epochs, continuing with the priority memory transfer may add an unnecessary computational load. Therefore, in accordance with one or more further embodiments, at some point, queuing is stopped, and the migration method is forced to select pages randomly. This may be done, for example, after T epochs (where, for example and without limitation, T is a configured amount) have executed or when the number of queued pages at an epoch is less than a configured threshold. Also, in using the hidden page fault method, a guest physical page corresponding to a faulting guest linear page may be put into data structure D after the guest linear page has faulted once, or only after it has faulted n number of times, n being a constant or a variable. As with N and x, setting n to a constant simplifies the implementation and requires striking a balance between usage of computational resources and memory access latency. On the other hand, setting n to be variable may enable a more precise and efficient control of the memory transfer.

In accordance with one or more embodiments of the present invention, shadow page tables are dropped for system maintenance for each VM, regardless of migration. That is, for each VM, the shadow page tables would be dropped, and the above-described methods would be used to reconstruct the shadow page tables and to migrate any faulting page that is stored remotely. This may be done periodically, for example and without limitation, at times when remote memory access occurrences pass a threshold. Such a maintenance operation would lead to improved performance by ensuring that pages accessed repeatedly are stored on a local NUMA node.

In accordance with one or more further embodiments of the present invention, working set pages (i.e., accessed pages that are stored on a remote NUMA mode) are identified using A-bits in a shadow page table. In accordance with one or more such embodiments, upon migration, and at the beginning of each epoch, the A-bits of all shadow page table entries are zeroed. Then, at the end of an epoch, for all shadow page table entries having the A-bit set, the guest physical page is migrated. Since such guest physical pages have been accessed during the last epoch, and they are likely to be in the working set of the VM. In addition, in accordance with one or more alternative such embodiments, various statistics can be applied to lists of pages having A-bits set over several epochs. For example, and without limitation, a table can be constructed to monitor how many times each page has been accessed over which epochs.

As with the previous embodiments, the use of the above-described A-bit clearing method may cease after a given time period, or after it has been determined that the working set has been migrated. Thereafter, another, for example and without limitation, less computationally taxing method may be used to select pages for migration.

Notably, even if a working set has been migrated, further migration may not select pages randomly. Rather, a "smart" selection may still be implemented. In accordance with one or more such embodiments, the hypervisor may chose a set of guest physical pages so that the memory becomes defragmented. For example, assume that 200 small pages belonging to a large page (for example, in an x86 architecture, the page size may be 2M, but other sizes and other architectures are also applicable) are yet to be migrated. If random migration is implemented, the large page may not be freed as a single "chunk" until all of the 200 pages have been migrated randomly. Moreover, migrating the pages randomly may lead to fragmentation of memory on the second node. On the other hand, by selecting all 200 small pages for migration simultaneously, the hypervisor will be able to free up the large page and maintain the pages together. Conversely, in any of the above methods, when a migrated VM accesses any part of a large page on the old NUMA node, if a large page is available, it can be remapped on the new node.

Moreover, in any of the above embodiments, the method may include predicting future priority pages based on spatial locality. For example, if a certain page has been identified as a priority page, e.g., by hidden page fault, then a modified method may list that page for migration, together with several page that are stored in spatial proximity to that page. Thus, if GPPN x has been identified as a priority page for migration, then pages x−1, x+1, etc., may also be scheduled for migration.

Figure 3:
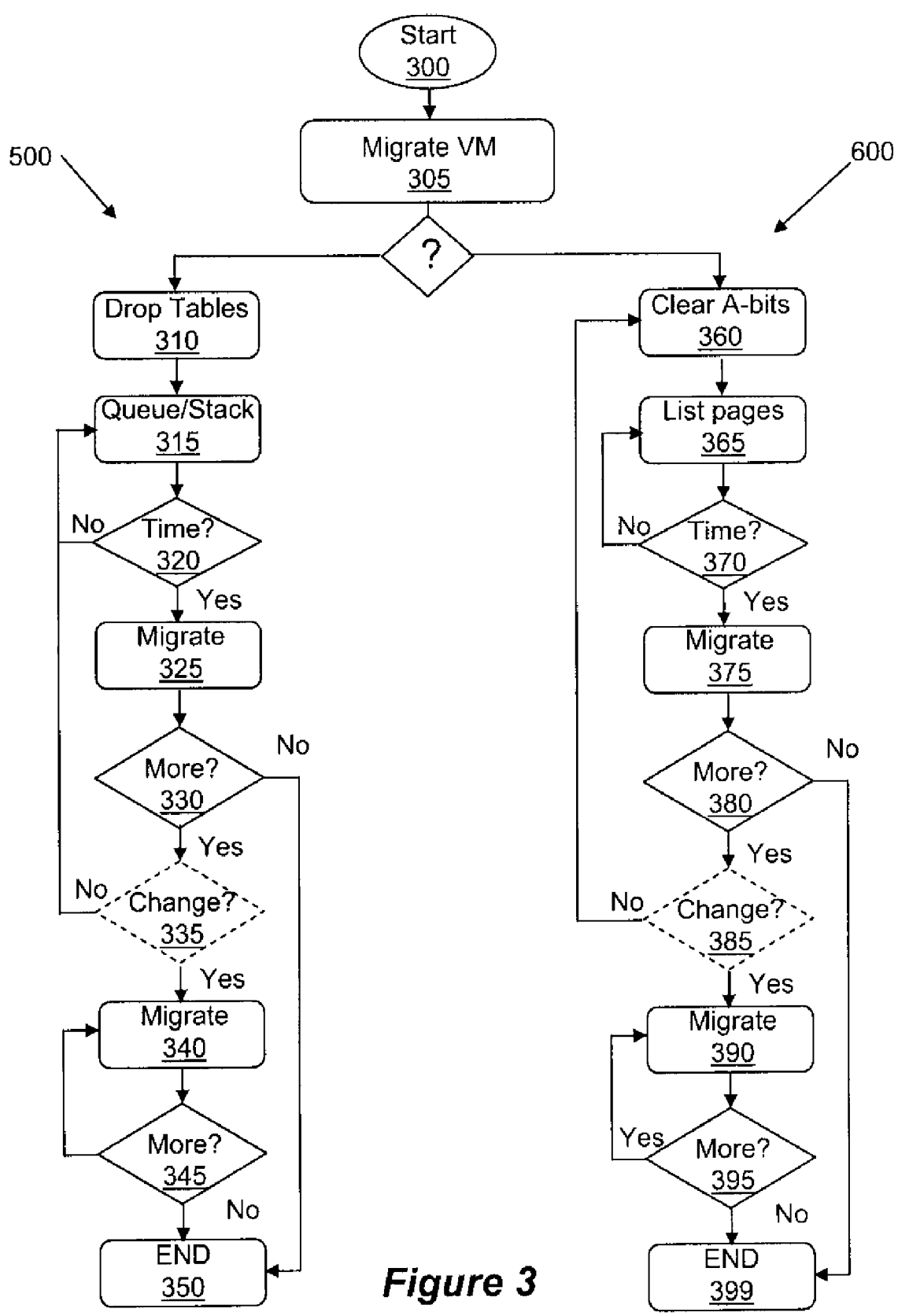
FIG. 3 is a flow chart summarizing steps that may be taken in accordance with one or more embodiments of the present invention.

FIG. 3 is a flow chart summarizing steps that may be taken in accordance with one or more embodiments of the invention. The method starts at box 300, and proceeds to migrate a virtual machine at step 305. Then, the method may proceed to execute process flow 500 shown on the left hand side of FIG. 3 or process flow 600 shown on the right hand side of FIG. 3. When proceeding to execute process flow 500, at step 310, the method drops tables (either shadow page tables (for the shadow method) or hypervisor page tables (for the hardware assisted method)). Then, at step 315, pages for migration are recorded when hidden page faults are generated. For example, faulting pages may be recorded as a set without regard to order, or they may be ordered by, for example and without limitation, queue, stack, etc. At decision step 320, process 500 determines whether it is time to migrate pages. This may be determined by monitoring elapsed time, by determining whether the hypervisor has reached a safe execution time, i.e., it's not in the middle serving other routines, and so forth. If the determination is positive, control is transferred to step 325 where the pages are migrated. The migration may be of queued/stacked pages, queued/stacked pages plus non-priority pages, and so forth, as described above. At decision step 330, process 500 determines whether there are more pages to migrate, and, if not, process 500 terminates at step 350. Otherwise, optionally, at step 335, process 500 determines whether the hypervisor should switch to a different migration method. Different migration method may be selected, e.g., after set amount of time period has passed, when fewer than a predetermined number of priority pages have been identified, etc. For example, the hypervisor may switch to a random page selection method, an A-bit clearance method (process 600 shown on the right side of FIG. 3), a method that minimizes defragmentation, and so forth. If not, control is transferred to step 315 to continue queuing/stacking of faulting pages. If a different method should be adopted, process 500 executes the new migration at step 340, and, at decision step 345, process 500 determines whether there are more pages to migrate. If no more pages need to be migrated, process 500 ends at 350.

On the other hand, for process 600, at step 360, the A-bits of all pages are cleared. At step 365, the hypervisor constructs a suitably sized list from pages having their A-bit set, indicating that an access was made since the A-bit was last cleared. At decision step 370, process 600 determines whether it is time to migrate pages. Again, this may be determined by monitoring elapsed time, by determining whether the hypervisor has reached a safe execution time, and so forth. If the determination is positive, control is transferred to step 375 where the pages are migrated. Again, the migration may be of queued/stacked pages, queued/stacked pages plus random pages, and so forth, as described above. At decision step 380, process 600 determines whether there are more pages to migrate, and, if not, process 600 terminates at step 399. Otherwise, optionally, process 600 determines whether the migration method should be changed at 385. If not, control is transferred to step 360, and process 600 clears the A-bits. Otherwise, process 600 adopts the new migration method, and executes the new migration at step 390. At decision 395, process 600 determines whether there are more pages to migrate, and, if not, process 600 ends at 399.

Figure 4:
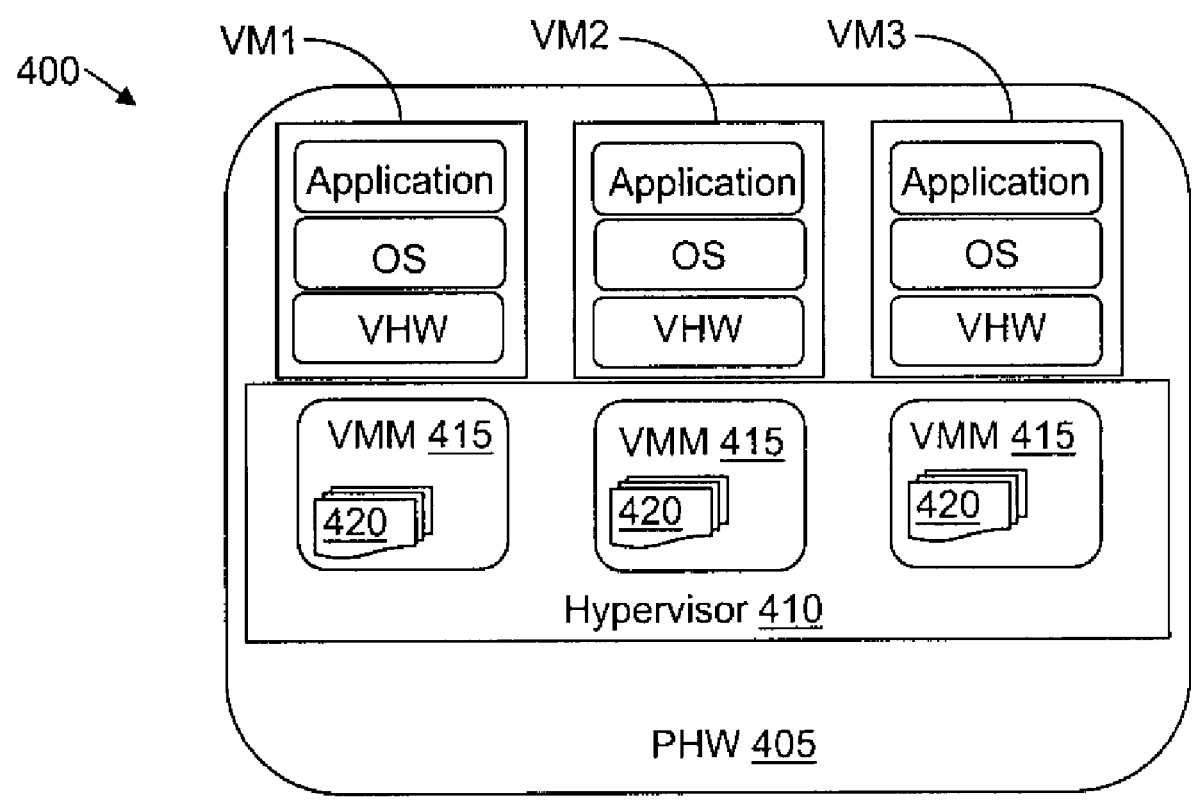
FIG. 4 is a schematic diagram of an embodiment of a virtual machine arrangement that is fabricated in accordance with one or more embodiments of the present invention.

FIG. 4 is a schematic diagram of virtual machine arrangement 400 that is fabricated in accordance with one or more embodiments of the invention. As shown in FIG. 4, three virtual machines VM1, VM2 and VM3 run on physical hardware machine 405. Each virtual machine includes an application, an operating system, and virtual hardware, which virtual hardware interface to physical hardware 405 via hypervisor 410. As further shown in FIG. 4, hypervisor 410 maintains a virtual machine monitor, VMM 415, for each virtual machine, and each VMM 415 maintains a prioritizer (prioritizer 420) for determining the order of pages to migrate upon VM migration. Prioritizer 420 may be implemented according to any of the above described methods, and may maintain a queue, stack, list etc., for ordering the pages to be migrated.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described methods and systems may be implemented in a wide variety of programming or scripting languages, such as Assembler, C/C++, perl, shell, PHP, Java, etc.

It should be appreciated that the foregoing descriptions of specific embodiments of the present invention are presented for purposes of illustration and description. They are not intended to be exhaustive or to limit the invention to the precise forms disclosed, and many modifications and variations are possible in view of the above teachings. The scope of the invention is to be defined by the claims appended hereto, and by their equivalents.

APPENDIX

Figure 1E:
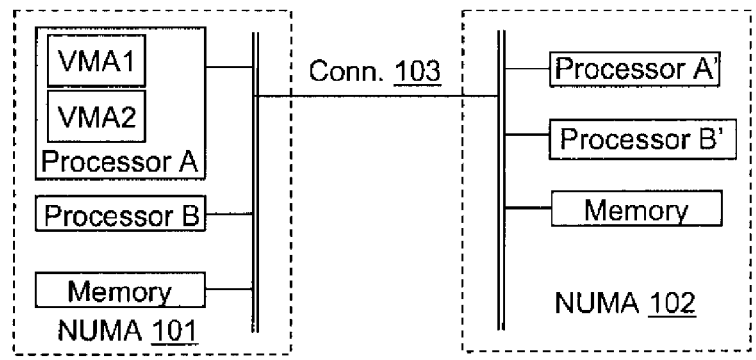
FIG. 1E is a block diagram that helps explain virtualization in a Non-Uniform Memory Access (NUMA) architecture.

As is well known in the field of computer science, a virtual machine (VM) is an abstraction—a "virtualization"—of an actual physical computer system. FIG. 1A shows one possible arrangement of computer system 70 that implements virtualization. A virtual machine (VM) or "guest" 20 is installed on a "host platform," or simply "host," which will include system hardware, that is, hardware platform 10, and one or more layers or co-resident components comprising system-level software, such as an operating system or similar kernel, or a virtual machine monitor or hypervisor (see below), or some combination of these. The system hardware typically includes one or more processors 11, memory 13, some form of mass storage 14, and various other devices 17.

Each VM 20, . . . , 20-n will typically have virtual system hardware 28 and guest system software 29. The virtual system hardware includes at least one virtual CPU, virtual memory 23, an optional virtual disk 24, and one or more virtual devices 27. Note that a disk virtual or physical—is also a "device," but is usually considered separately because of the important role of the disk. All of the virtual hardware components of the VM may be implemented in software using known techniques to emulate the corresponding physical components. The guest system software includes guest operating system (OS) 22 and drivers 25 as needed for the various virtual devices 27.

Note that a single VM may be configured with more than one virtualized processor; FIG. 1A illustrates multiple virtual processors 21-0, 21-1, . . . , 21-m (VCPU0, VCPU1, . . . , VCPUm) within VM 20. For example, symmetric multi-processor (SMP) systems exist wherein a hardware platform with multiple processors are connected to a shared main memory and shared 110 devices. Similarly, VMs may configured as SMP VMs. In addition, multi-processor systems exist in a so-called "multi-core" architecture, wherein more than one physical CPU is fabricated on a single chip and having its own set of functional units (such as a floating-point unit and an arithmetic/logic unit ALU), and where threads can be executed independently; multi-core processors typically share limited resources, such as some cache—VMs may be configured as multi-core systems. In addition, simultaneous execution of multiple threads in which more than one logical CPU operates simultaneously on a single chip, but in which the logical CPUs flexibly share one or more resources such as caches, buffers, functional units, etc. One or more embodiments of the present invention may be used regardless of the type—physical and/or logical—or number of processors included in a VM.

Some interface is generally required between the guest software within a VM and various hardware components and devices in the underlying hardware platform. This interface—which may be referred to generally as "virtualization software"—may include one or more software components and/or layers, possibly including one or more of the software components known as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself; however, the term "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in a host OS itself; moreover, there may also be specific support for virtualization in the system hardware. Unless otherwise indicated, embodiments of the present invention may be used in virtualized computer systems having any type or configuration of virtualization software.

FIG. 1A shows virtual machine monitors 30, . . . , 30-*n* that appear as separate entities from other components of the virtualization software. Some software components used to implement one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. Unless otherwise indicated, embodiments of the present invention may be used in virtualized computer systems having any type or configuration of virtualization software. Moreover, embodiments of the present invention are described and illustrated herein primarily as including one or more virtual machine monitors that appear as separate entities from other components of the virtualization software and perform certain functions relating to one or more embodiments of the present invention. This is only for the sake of simplicity and clarity of explanation and by way of illustration—as mentioned above, the distinctions are not always so clear-cut, and the use of the term virtual machine monitor or just VMM is meant to encompass any component(s) in the virtualization software that perform the described functions, regardless of what name they are given. Again, unless otherwise indicated or apparent from the description, it is to be assumed that embodiments of the present invention can be implemented anywhere within the overall structure of the virtualization software, and even in systems that provide specific hardware support for virtualization.

Various virtualized hardware components in the VM, such as the virtual CPU(s) VCPU0 21-0 to VCPUm 21-*m*, virtual memory 23, virtual disk 24, and virtual device(s) 27, are shown as being part of VM 20 for the sake of conceptual simplicity and ease of understanding. In actuality, these "components" are usually implemented as software emulations 33 included in VMM1 30.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1A). In a hosted virtualized computer system, an existing, general-purpose operating system forms a "host" OS that is used to perform certain input/output (I/O) operations, alongside and sometimes at the request of the VMM. The host OS, which usually includes drivers and supports applications of its own, and the VMM are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847

(Bugnion, et al., "System and Method for Virtualizing Computer Systems," 17 Dec. 2002).

In addition to device emulators, other components are also often included in the VMM of a hosted virtualization system; many of these components are found in the VMM of a non-hosted system as well. For example, interrupt/exception handlers may be included to help context-switching, and a direct execution engine and binary translator with associated a translation cache may be included to provide execution speed while still preventing the VM from directly executing certain privileged instructions.

What is claimed is:

1. In a computing system having a plurality of processors, each processor assigned to one of a plurality of Non-Uniform Memory Access (NUMA) nodes, a method for migrating a virtual machine and memory pages from a first processor assigned to a first NUMA node to a second processor assigned to a second NUMA node, comprising:
   a. migrating the virtual machine from the first processor assigned to the first NUMA node to the second processor assigned to the second NUMA node, and operating the virtual machine on the second NUMA node while enabling the virtual machine on the second NUMA node to have memory access on the first NUMA node;
   b. monitoring memory access requests of the virtual machine operating on the second processor assigned to the second NUMA node, and based on the memory access requests identifying priority pages for migration from the first NUMA node to the second NUMA node;
   c. initiating page migration process and migrating at least a subset of the priority pages from the first NUMA node to the second NUMA node.

2. The method of claim 1, wherein steps b. and c. are repeated until occurrence of at least one event selected from:
   a set number of steps b. and c. has been repeated;
   fewer than a predetermined number of priority pages have been identified;
   a set amount of time period has passed;
   all of the pages have been migrated from the first node to the second node; or
   the virtual machine has been migrated away from the second node.

3. The method of claim 2, further comprising, upon termination of repeating steps b. and c., migrating any remaining pages according to one of: random selection or fragmentation minimizing selection or sequential selection.

4. The method of claim 1, wherein step b. comprises monitoring hidden page faults and identifying faulting pages residing on the first node as priority pages.

5. The method of claim 4, wherein step a. further comprises discarding one of shadow page tables or second level page tables upon migrating the virtual machine to the second node.

6. The method of claim 5, further comprising discarding one of shadow page tables or second level page tables upon each completion of step c.

7. The method of claim 1, wherein in step c., a predetermined number of N pages is migrated and wherein:
   when the number of priority pages comprises less than N, the method proceeds by migrating all the priority pages and selecting further pages from the first node; and
   when the number of priority pages comprises more than N, the method proceeds by migrating only N priority pages.

8. The method of claim 7, wherein N may be dynamically varied.

9. The method of claim 1, wherein step b. comprises clearing access bits of memory page table entries (PTE) residing on the first node and thereafter identifying as a priority page each page having its corresponding PTE access bit set by an access operation.

10. The method of claim 9, further comprising clearing access bits of memory page table entries (PTE) residing on the first node after each completion of step c.

11. The method of claim 1, wherein step b. comprises clearing the P-bits of shadow page table entries that translate a guest linear address to a host physical address on pages residing on the first node.

12. The system of claim 1, wherein in step c. migration is initiated when:
   a predetermined time period has elapsed; or
   the number of priority pages reaches a predetermined threshold.

13. The method of claim 1, further comprising, for each one of the pages corresponding to memory access requests, designating neighboring pages as priority pages.

14. In a computing system having a plurality of processors, each processor assigned to one of a plurality of Non-Uniform Memory Access (NUMA) nodes, a machine executable process for migrating a virtual machine and memory pages from a first processor assigned to a first NUMA node to a second processor assigned to a second NUMA node, comprising:
   a. migrating the virtual machine from the first processor assigned to the first NUMA node to the second processor assigned to the second NUMA node, and operating the virtual machine on the second NUMA node while enabling the virtual machine on the second NUMA node to have memory access on the first NUMA node;
   b. setting a time period for periodic migration of pages from the first node to the second node and, during each period performing the steps:
   b.1. monitoring memory access requests of the virtual machine operating on the second NUMA node and identifying priority pages corresponding to memory access requests mapped to pages on the first NUMA node;
   b.2. when the time period has elapsed, initiating page migration process and migrating priority pages from the first NUMA node to the second NUMA node; and,
   b.3. determining whether the process should revert to step b.1. or terminate.

15. The process of claim 14, further comprising, when the process terminates at step b.3., performing page migration according to a secondary procedure.

16. The process of claim 15, wherein the secondary procedure comprises at least one of, random migration, minimizing defragmentation migration, and migrating pages having A-bit set.

17. The process of claim 14, wherein step b.1. comprises monitoring hidden page faults and identifying faulting pages residing on the first NUMA node as priority pages.

18. The process of claim 17, further comprising arranging the priority pages in a queue or a stack.

19. The process of claim 18, wherein step a. further comprises discarding one of shadow page tables or second level page tables upon migrating the virtual machine to the second NUMA node.

20. The process of claim 14, wherein step b.1. comprises clearing access bits of memory page table entries (PTE) residing on the first NUMA node and thereafter identifying each page having its corresponding PTE access bit set due to access operation as priority page.

21. The process of claim 14, wherein step b.1., further comprises for each one of the pages corresponding to memory access requests, designating neighboring pages as priority pages.

22. A computerized virtual machine in a computing system, comprising:
- a plurality of processors, each processor assigned to one of a plurality of Non-Uniform Memory Access (NUMA) nodes, a plurality of memory devices wherein each memory device is assigned to one of the NUMA nodes, a plurality of busses, each connects one of the memory devices assigned to one of the NUMA nodes to one of the processors assigned to a corresponding NUMA node, and interconnect coupling the plurality of NUMA nodes;
- virtualized hardware emulated on a first processor from the plurality of processors and assigned to a first NUMA node of the plurality of NUMA nodes;
- virtual machine monitor executing on the first processor;
- a plurality of virtual pages stored in a memory device assigned to the first NUMA node;
- page mapping tables stored in a memory device assigned to the first NUMA node and storing mapping of virtual page numbers to guest physical page numbers; and,
- a prioritizer stored in a memory device assigned to the first NUMA node and listing priority pages having priority for migration.

23. The virtual machine of claim 22, wherein the prioritizer comprises a queue or a stack.

24. The virtual machine of claim 22, further comprising hidden page fault identifier, which provides faulting page identification to the prioritizer.

25. The virtual machine of claim 22, further comprising an access bit identifier that provides page identification to the prioritizer according to the access bit setting corresponding to the virtual pages.

26. A computer readable storage medium holding computer software for executing on the destination computer, the software embodying a method comprising:
- upon receiving migration instruction for migrating a virtual machine from a first Non-Uniform Memory Access (NUMA) node to a second NUMA node, performing the steps:
  - a. migrating the virtual machine to the second NUMA node and operating the virtual machine on the second NUMA node while enabling the virtual machine on the second NUMA node to have memory access on the first NUMA node;
  - b. discarding page tables comprising mapping of virtual pages to machine pages on the first NUMA node;
  - c. setting a time period for periodic migration of pages from the first NUMA node to the second NUMA node and, during each period performing the steps:
    - c.1. whenever a memory access on the first NUMA node by the virtual machine on the second NUMA node generates a hidden page fault, storing identity of faulting page addressed by the page call;
    - c.2. when the time period has elapsed, initiating page migration process and migrating N pages from the first NUMA node to the second NUMA node, wherein N comprises a natural number and the N pages include at least the faulting pages;
    - c.3. determining whether the process should revert to step c.1. or terminate.

27. The computer readable storage medium claim 26, wherein during at least one iteration of steps c.1. to c.3. the N pages comprise the faulting pages and randomly selected pages.

28. A computer readable storage medium holding computer software for executing on the destination computer, the software embodying a method comprising:
- upon receiving migration instruction for migrating a virtual machine from a first node Non-Uniform Memory Access (NUMA) node to a second NUMA node, performing the steps:
  - a. migrating the virtual machine to the second NUMA node and operating the virtual machine on the second NUMA node while enabling the virtual machine on the second NUMA node to have memory access on the first NUMA node;
  - b. setting a time period for periodic migration of pages from the first NUMA node to the second NUMA node and, during each period performing the steps:
    - b.1. clearing access bit of all pages stored in the memory on the first NUMA node, and whenever the virtual machine on the second NUMA node accesses a page stored in the memory on the first NUMA node setting the access bit of the page to indicate occurrence of page access;
    - b.2. when the time period has elapsed, checking the access bit of all pages, and listing accessed pages having their access bit set to indicate occurrence of page access since last clear;
    - b.3. initiating page migration process and migrating N pages from the first NUMA node to the second NUMA node, wherein N comprises a natural number and the N pages include at least the accessed pages;
    - b.4. determining whether the process should revert to step b.1. or terminate.

29. The computer readable storage medium of claim 28, wherein during at least one iteration of steps b.1. to b.4. the N pages comprise the accessed pages and randomly selected pages.

* * * * *